US012339736B2

(12) United States Patent
Ocher et al.

(10) Patent No.: US 12,339,736 B2
(45) Date of Patent: Jun. 24, 2025

(54) ROBUST DATA TRANSFER TO CLOUD AND ON-PREMISE STORAGE SYSTEMS

(71) Applicant: SAP SE, Walldorf (DE)

(72) Inventors: Alexander Ocher, San Jose, CA (US); Sreenivasulu Gelle, San Ramon, CA (US)

(73) Assignee: SAP SE, Walldorf (DE)

( * ) Notice: Subject to any disclaimer, the term of this patent is extended or adjusted under 35 U.S.C. 154(b) by 112 days.

(21) Appl. No.: 18/358,332

(22) Filed: Jul. 25, 2023

(65) Prior Publication Data

US 2025/0036515 A1  Jan. 30, 2025

(51) Int. Cl.
*G06F 11/00* (2006.01)
*G06F 11/07* (2006.01)
*G06F 16/25* (2019.01)

(52) U.S. Cl.
CPC ...... *G06F 11/0793* (2013.01); *G06F 11/0727* (2013.01); *G06F 16/254* (2019.01)

(58) Field of Classification Search
CPC . G06F 11/0793; G06F 11/0727; G06F 16/254
See application file for complete search history.

(56) References Cited

U.S. PATENT DOCUMENTS

| | | | |
|---|---|---|---|
| 8,060,714 B1 | 11/2011 | Natanzon | |
| 8,572,051 B1* | 10/2013 | Chen | G06F 16/24532 |
| | | | 707/999.2 |
| 8,769,336 B1 | 7/2014 | Natanzon et al. | |
| 8,903,779 B1 | 12/2014 | Holenstein et al. | |
| 9,679,033 B2* | 6/2017 | Bonagiri | G06F 16/254 |
| 2007/0067488 A1* | 3/2007 | McIntire | G06F 16/254 |
| | | | 709/238 |
| 2008/0016387 A1 | 1/2008 | Bensinger | |
| 2010/0191884 A1* | 7/2010 | Holenstein | G06F 16/2343 |
| | | | 707/613 |
| 2014/0181022 A1 | 6/2014 | Ngo | |
| 2014/0181579 A1 | 6/2014 | Whitehead et al. | |

(Continued)

OTHER PUBLICATIONS

SAP HANA Cloud, SAP HANA Database SQL Reference Guide, Import From Statement (Data Import Export), 7 pages (accessed Jun. 5, 2023).

(Continued)

*Primary Examiner* — Philip Guyton
(74) *Attorney, Agent, or Firm* — Klarquist Sparkman, LLP

(57) ABSTRACT

A computer implemented method can obtain, in a data transfer system, a plurality of data records from data sources and monitor operating status of a target application running on a target machine. Responsive to finding that the target application stops operating, the method can send one or more first data records from the data transfer system to the target machine and store the first data records in a target buffer on the target machine. Responsive to finding that the target application resumes operating, the method can send one or more second data records from the data transfer system to the target machine and directly store the second data records in a data repository. While sending the one or more second data records, the method can transfer the one or more first data records from the target buffer to the one or more target databases.

20 Claims, 6 Drawing Sheets

(56) References Cited

U.S. PATENT DOCUMENTS

| | | | | |
|---|---|---|---|---|
| 2014/0281699 A1* | 9/2014 | Kota | ................... | G06F 9/3861 |
| | | | | 714/15 |
| 2015/0227437 A1* | 8/2015 | Eidelman | ............ | G06F 11/1456 |
| | | | | 714/6.23 |
| 2017/0068595 A1* | 3/2017 | Nautiyal | ............... | G06F 16/254 |
| 2021/0271648 A1* | 9/2021 | Arbel | ..................... | G06F 16/21 |
| 2022/0012139 A1 | 1/2022 | Nowatzyk et al. | | |

OTHER PUBLICATIONS

Ibm, "What is ETL (Extract, Transform, Load)?", https://www.ibm.com/topics/etl, 9 pages (accessed Jun. 9, 2023).

AWS, "What is ETL (Extract, Transform, Load)?", https://aws.amazon.com/what-is/et/#: ~:text=Extract%2C transform%2C and load (,and machine learning (ML), 10 pages (accessed Jun. 9, 2023).

Wikipedia, "Internet Control Message Protocol," https://en.wikipedia.org/wiki/Internet_Control_Message_Protocol, 8 pages (accessed Jul. 14, 2023).

Extended European Search Report for European Patent Application No. 24184268.1, 10 pages, Dec. 11, 2024.

Comartin, "Synchronous vs. Messaging: When to use which?," https://web.archive.org/web/20230322150531/https://codeopinion.com/synchronous-vs-messaging-when-to-use-which, 5 pages, Mar. 22, 2023.

* cited by examiner

ROBUST DATA TRANSFER TO CLOUD AND ON-PREMISE STORAGE SYSTEMS

BACKGROUND

An ETL (Extract, Transform, Load) system is a software framework or architecture designed to integrate and consolidate data from multiple sources into a centralized target system or data warehouse. The ETL systems are widely used in data integration processes, especially in scenarios where data is scattered across various sources with different formats and structures. They enable organizations to bring disparate data together, harmonize it, and make it accessible for decision-making, business intelligence, data analysis, and reporting purposes. However, existing ETL systems often lack efficiency and robustness in data transfer, which can slow the overall ETL process. Thus, there is room for improvement of the ETL systems.

DETAILED DESCRIPTION

Example 1—Overview of ETL Process

Figure 1:
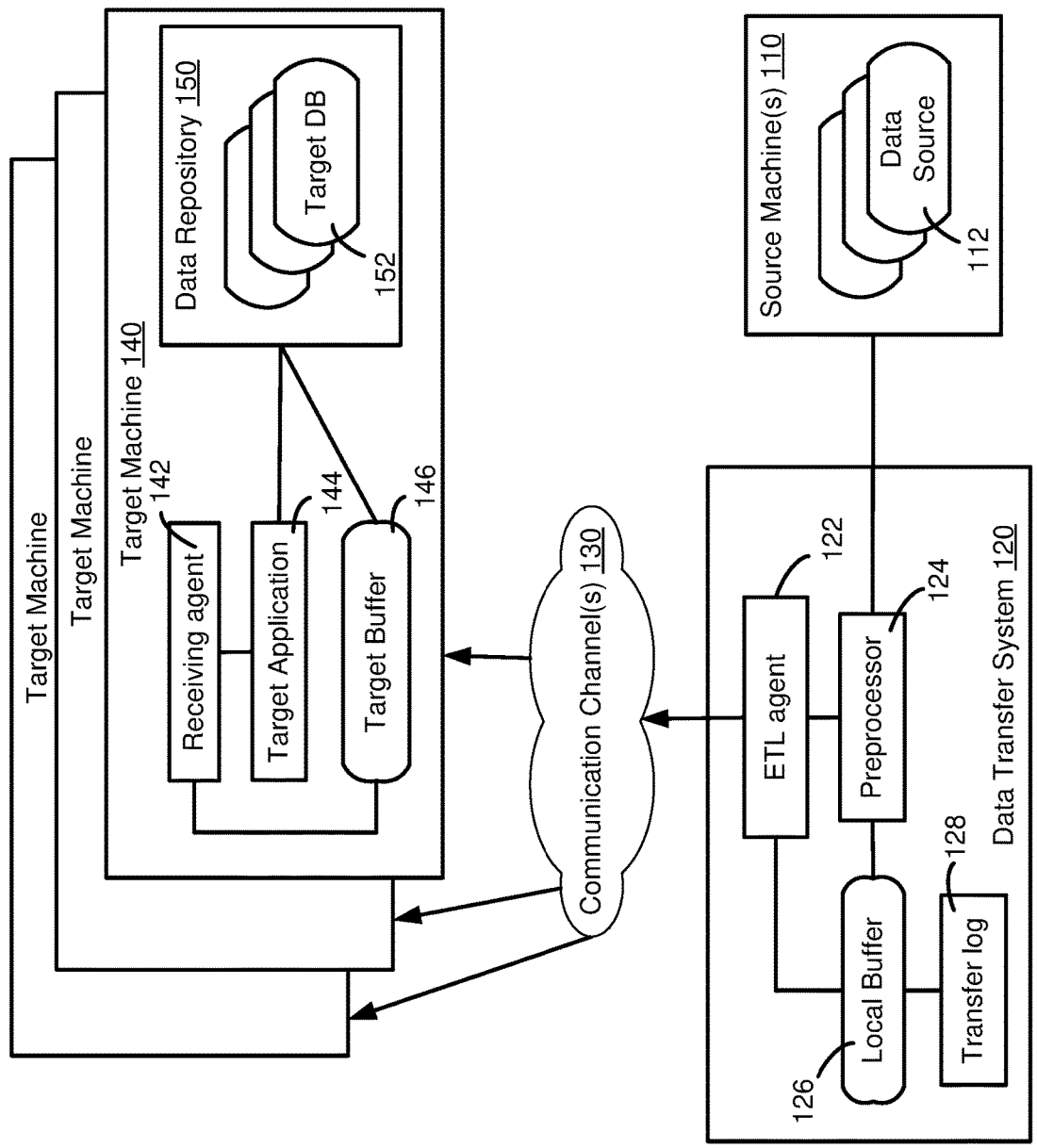
FIG. 1 is an overall block diagram of an example computing system supporting improved ETL process.

An ETL process typically involves three phases: data extraction, data transformation, and data loading. In the data extraction phase, the ETL system retrieves data from different types of sources, such as databases, files, application programming interfaces (APIs), or web scraping. Extraction methods can depend on the source system and may involve querying databases, using APIs to fetch data, or parsing files in various formats. Once the data is extracted, the ETL system enters the data transformation phase, which typically involves cleaning, filtering, validating, and restructuring the data to meet specific requirements. This phase can include tasks like data cleansing (e.g., removing duplicates or errors), data integration (e.g., merging data from different sources), and data enrichment (e.g., adding additional information to the data). The data transformation phase often involves complex calculations and business logic. After the data is transformed, the ETL system can move to the data loading phase, during which the transformed data is loaded into (or transferred to) the target system or data warehouse. Loading can involve inserting data into tables, updating existing records, creating new data structures, merging with previously loaded data, etc.

However, existing ETL systems often lack efficiency and robustness in the loading phase, which can become a bottleneck in the overall ETL process. As a result, it may take very long time for the transformed data to be loaded to the target system.

For example, if the ETL process involves loading data from remote sources or across distributed systems, network latency can cause delays in data transfer and consequently slow down the loading phase. In many existing ETL systems, network interruption can bring the ETL process to a halt. In some cases, network failure may even abort the ETL process, which must be restarted later when the network is back on again.

In some circumstances, the hardware and/or software of the target system can also affect the loading speed. For instance, insufficient computing resources and/or limited disk I/O capabilities can contribute to slower loading times. In some cases, the application running on the target system for data loading (referred to as "target application" hereinafter) can be non-responsive (e.g., due to insufficient CPU and/or memory, etc.) or completely shut down (e.g., due to software crash, system maintenance, etc.). As a result, the transformed data cannot be received by the target system and stored in target databases even if the network connection remains excellent. In many existing ETL systems, when the target application is not running properly, the ETL process is paused, or aborted.

The technologies described herein can improve the efficiency of ETL systems. Specifically, the technologies described herein support more efficient and robust data loading, allowing the transformed data to be transferred to the target system and stored in target data storage with minimal delay, even in the presence of unstable network connection and/or non-responsive target application.

Example 2—Example Computing System Supporting Improved ETL Process

FIG. 1 shows an overall block diagram of an example computing system 100 supporting improved ETL process.

As shown in FIG. 1, the computing system 100 can include one or more source machines 110, a data transfer system 120 (which can also be referred to as an "ETL system"), one or more communication channels 130, and one or more target machines 140. Each target machine 140 can include or be linked to a corresponding data repository 150.

The source machines 110 can maintain one or more data sources 112. The data sources 112 contain original data that needs to be extracted, processed, and loaded by an ETL system. The data sources 112 can vary in format depending on specific requirements of the project or organization. For example, the data sources 112 can be relational or non-relation databases, structured or unstructured data files, web APIs, log files, message queues, real-time data streams, etc.

The data transfer system 120 can include an ETL agent 122, a preprocessor 124, a local buffer 126, and a transfer log 128. In the depicted example, the source machines 110 are separate from the data transfer system 120. In other examples, the source machines 110, or at least part of the data sources 112, can be part of the data transfer system 120.

In some examples, the preprocessor 124 can be an application running on the data transfer system 120 and configured to extract original data from the data sources 112, and transform the extracted original data into a plurality of data records that will be send to the target machines 140 for storage in the data repository 150. Example transformations performed by the preprocessor 124 include data cleansing (e.g., removing errors and inconsistencies), data integration (e.g., combining data from multiple data sources), data filtering (e.g., selecting relevant data), data aggregation (e.g., summarizing or consolidating data), data enrichment (e.g., adding additional information), data normalization (e.g., restructuring data into a consistent format), data validation (e.g., ensuring data meets predefined rules), data deduplication (e.g., removing duplicate records), data formatting (e.g., converting data into a desired format), and data calculations (e.g., performing mathematical or logical operations). These transformations help ensure data quality, consistency, and usability for analysis, reporting, or storage purposes.

In some examples, the ETL agent 122 can be an application configured to coordinate the data extraction, data transformation, and data loading phases of the ETL process. For example, the ETL agent 122 can control operations performed by the preprocessor 124 by identifying data sources 112 for data extraction and specifying particular steps and/or parameters for data transformation. The ETL agent 122 can also control the data loading operations on the sender's side. For example, the ETL agent 122 can determine the timing, frequency, mode, channels, and other aspects of transmitting the data records from the data transfer system 120 to the target machines 140. In some examples, the ETL agent 122 can operate the ETL process in a batch mode, where data extraction, transformation, and loading are processed in predefined intervals. In some examples, the ETL agent 122 can operate the ETL process in real-time or substantially in real-time. In some examples, the ETL agent 122 can send the same data records to multiple target machines 140 in parallel.

In some examples, the ETL agent 122 can be configured to monitor, continuously and/or periodically, whether reliable communication can be established between the data transfer system 120 and the target machines 140. For example, the ETL agent 122 can determine if any of the communication channels 130 is open (e.g., operating normally with negligible network delay) or closed (e.g., network failure or experiencing significant network latency). As another example, the ETL agent 122 can ping the target machines 140 to determine if they are online or offline. In some examples, the connection status of communication channels 130 and the target machines 140 can be diagnosed based on a network protocol, such as the Internet control message protocol (ICMP).

In some examples, when the data records cannot be sent to the target machines 140, e.g., due to unstable network connections and/or the target machines being down or offline, the ETL agent 122 can store residual data records in the local buffer 126. As described herein, the residual data records refer to those data records that have not been sent from the data transfer system 120 to the target machines 140. When the network connections are restored and/or the target machines are back on running, the ETL agent 122 can resume the data loading process by sending the residual data records stored in the local buffer 126 to the target machines 140, instead of recreating those data records through the preprocessor 124, which can be time-consuming.

In some examples, the transfer log 128 can keep track of what data records have been sent to each of the target machines 140. For example, when the data records need to be sent according to a specific sequence, the transfer log 128 can keep track of last data records that have been sent from the data transfer system 120 to multiple target machines 140. Using the transfer log 128, the ETL agent 122 can determine, for each target machine 140, what residual data records stored in the local buffer 126 need to be sent.

In some examples, the data records stored in the local buffer 126 can be a union of all residual data records corresponding to all target machines 140. As described herein, the union of multiple sets of residual data records refers to the combination of unique residual data records from those sets, resulting in a new set that contains all distinct residual data records from the multiple sets (that is, merging the multiple sets without including any duplicate residual data records). Thus, the data records contained in the local buffer 126 are the residual data records for one of the target machines 140 that missed the most data record transmission. For other less affected target machines, only some of the data records contained in the local buffer need to be transmitted. As such, the size of the local buffer 126 can be reduced compared to saving residual data records for each target machine separately.

The communication channels 130 can connect the data transfer system 120 to the target machines 140. In some examples, each target machine 140 can have its own communication channel with the data transfer system 120. Thus, disruption of one communication channel linked to one target machine will not interfere with data loading to another target machine through another communication channel. In some examples, multiple target machines 140 can share the same communication channels for communicating with the data transfer system 120. The communication channels can include a variety of wired and/or wireless networks, such as Internet, ethernet, Wi-Fi, cellular networks, etc.

The target machines 140 are the recipients of the data records (extracted from the data source and transformed by the preprocessor). The data repository 150 is the final destination of the received data records. For example, the data repository 150 can include one or more target databases 152 for storage of the data records received by the target machines 140. In some examples, the data repository 150 can be configured as data warehouses, data lakes, etc. In the depicted example, the data repository 150 is part of the target machines 140 so that the data repository 150 is local to a target application 144 which is described more fully below. In other examples, the data repository 150 can be external to the target machines 140. As described herein, the target machines 140 and/or the data repository 150 can be configured on-premises or in the cloud.

Each target machine 140 can have a receiving agent 142 configured to control the data loading operations on the receiver's side. Each target machine 140 can also have a target application 144 (which can also be referred to as a "data loading application") configured to manage data storage in the data repository 150. For example, the target application 144 can be a database management software configured to store received data records in one or more target databases 152. The receiving agent 142 can be a software application configured to continuously and/or periodically monitor the operating status of the target application 144. Additionally, the receiving agent 142 can coordinate receiving data records sent from the data transfer system 120 (e.g., by the ETL agent 122). For example, when the target application 144 operates normally, the receiving agent 142 can route the data records to the target application 144, which can directly store the received data records in the data repository 150.

In some examples, the target application 144 may be temporarily not available for receiving data records. For example, the target application 144 may be non-responsive (e.g., stop operating) due to insufficient computing resources or crashed for any number of reasons. After detecting the non-responsiveness of the target application 144, the receiving agent 142 can redirect the data records sent from the data transfer system 120 to a target buffer 146 on the target machine 140 for local storage.

After detecting that the target application 144 becomes responsive again (e.g., resumes operating), the receiving agent 142 can direct the data records stored in the target buffer 146 to be transferred to the data repository. Because the data records stored in the target buffer 146 can be directly written into the data repository 150 (i.e., do not need to be re-transmitted through the communication channels 130), any transmission delay through the communication channels 130 can be avoided. Meanwhile, the target application 144 can continue receiving new data records from the data transfer system 120 and directly storing the new data records in the data repository. In other words, two threads of data transfer can run in parallel or concurrently: (1) transfer of previously transmitted data records (when the target application 144 was non-responsive) from the target buffer 146 to the data repository 150; and (2) transfer of new data records from the data transfer system 120 to the data repository 150 (through the target application). Compared to an alternative sequential data storage protocol (e.g., first transfer data records from the target buffer 146 to the data repository 150 and then transfer new data records from the data transfer system 120 to the data repository 150, or vice versa), such concurrent data storage protocol can further improve the efficiency of the data loading process.

In some examples, the receiving agent 142 can be configured to synchronize storage of the data records in the two concurrent threads. For example, the receiving agent 142 can identify conflicts that may arise when attempting to insert or update the same records in the data repository 150 from the two threads, resolve the conflicts based on pre-define rules or policies (e.g., prioritizing one thread over another thread, merging conflicting data records, etc.), optimizing and/or maintaining consistency of data storage, etc.

In the example depicted in FIG. 1, the data transfer system 120 is connected to each target machine 140 via a corresponding communication channel 130. In other examples, at least one target machine 140 (including the data repository 150 associated with the target machine) can be an integral part of the data transfer system 120 such that the target machine 140 is local to the ETL agent 122 (thus, there is no need for a dedicated communication channel connecting from the data transfer system to the target machine). In such circumstances, the ETL agent 122 can be integrated with the receiving agent 142 to coordinate the ETL process (e.g., controlling the preprocessor 124 for data extraction and data transformation and the target application for data loading). Additionally, the local buffer 126 and the target buffer 146 can be merged as an integrated data buffer. The integrated data buffer can be used to temporarily store data records generated by the preprocessor 124 when the target application 144 stops operating. When the target application 144 resumes operating, the data records stored in the integrated data buffer can be transferred to the data repository 150. At the same time, the target application 144 can directly store new data records generated by the preprocessor 124 into the data repository 150.

In practice, the systems shown herein, such as the computing system 100, can vary in complexity, with additional functionality, more complex components, and the like. For example, there can be additional functionality within the data transfer system 120 and/or the target machines 140. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the applications, data records, status parameters, and the like can be stored in one or more computer-readable storage media or computer-readable storage devices. The technologies described herein can be generic to the specifics of operating systems or hardware and can be applied in any variety of environments to take advantage of the described features.

Example 3—Example Overall Method for Efficient Loading in ETL Process

Figure 2:
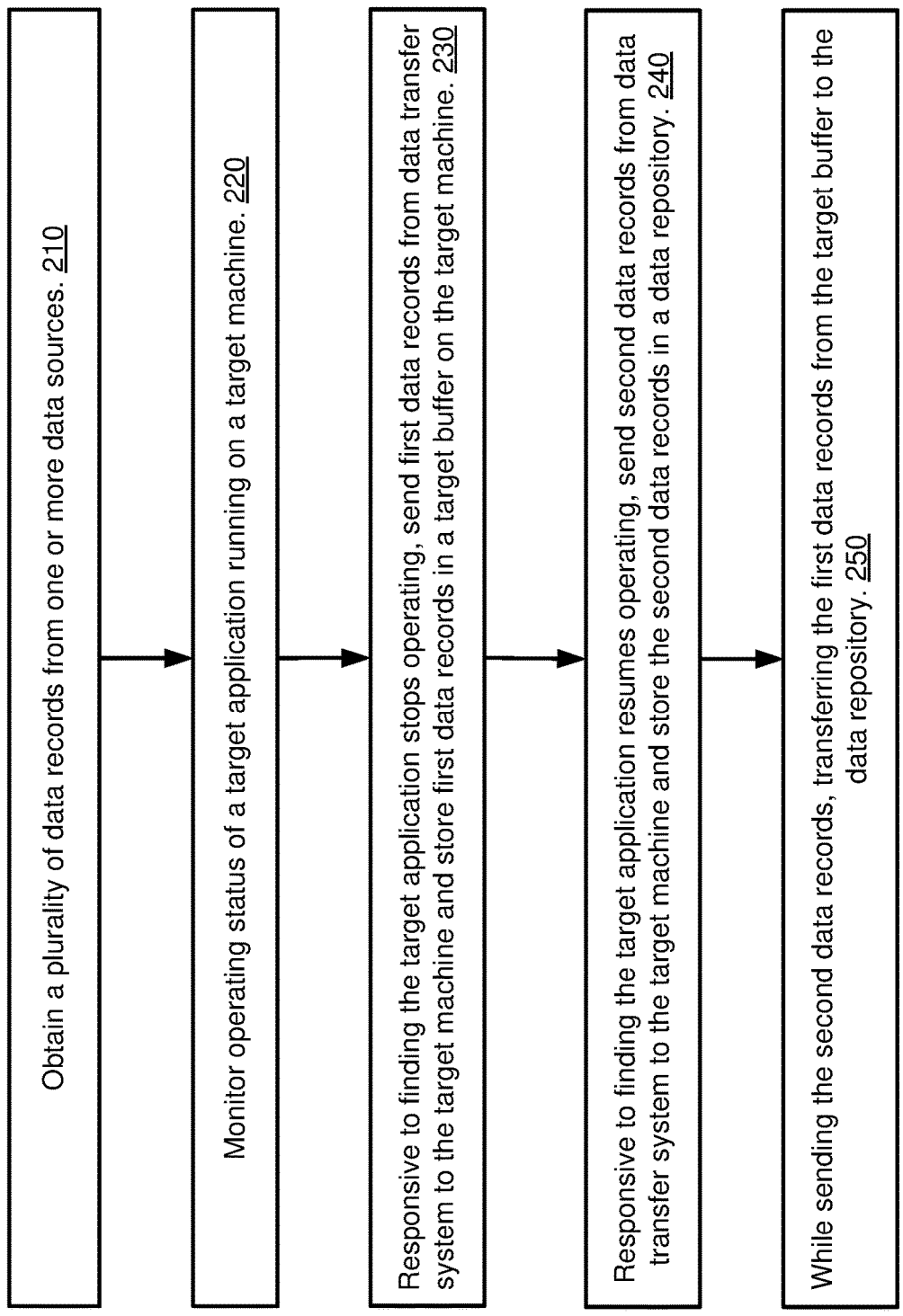
FIG. 2 is a flowchart illustrating an example overall method for efficient data loading in an ETL process.

FIG. 2 is a flowchart illustrating an example overall method 200 for efficient data loading in an ETL process, and can be performed, for example, by the computing system 100 of FIG. 1.

At 210, a plurality of data records can be obtained from one or more data sources, e.g., by the data transfer system 120. For example, under the control of the ETL agent 122, the preprocessor 124 can extract original data from the data sources 112 and transform the extracted original data into the plurality of data records.

At 220, the operating status of a target application running on a target machine can be monitored. As described above, the target application can be configured to manage data storage in a data repository. In some examples, monitoring the operating status of the target application can be performed by the ETL agent 122, e.g., by checking one or more parameter values of the target application through an API of the target application. For instance, the ETL agent 122 can periodically check version number of the target application by making the API call. Returning a valid version number by the API call can indicate normal operation of target application, wherein returning of an invalid version number can indicate that the target operation stops operating.

At 230, responsive to finding that the target application stops operating, one or more data records can be sent from the data transfer system to the target machine and storing the received data records in a target buffer (e.g., the target buffer 146) residing on the target machine. The data records sent to the target machine during the period when the target application is non-operative can be referred to as the "first data records." In some examples, receiving the first data records and storing the same in the target buffer can be performed by the receiving agent 142.

At 240, responsive to finding that the target application resumes operating, additional data records (which can also be referred to as "second data records" and are distinct from the first data records) can be sent from the data transfer system to the target machine and directly stored in the data repository. Receiving the second data records and storing the same in the data repository can be performed by the target application.

At 250, while sending the second data records, the first data records can be transferred from the target buffer to the data repository. In other words, the first data records and the second data records can be saved in the data repository in parallel. In some examples, transferring the first data records from the target buffer to the data repository can be performed by the receiving agent 142.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example 4—Example Data Flow of Improved ETL Process

Figure 3:
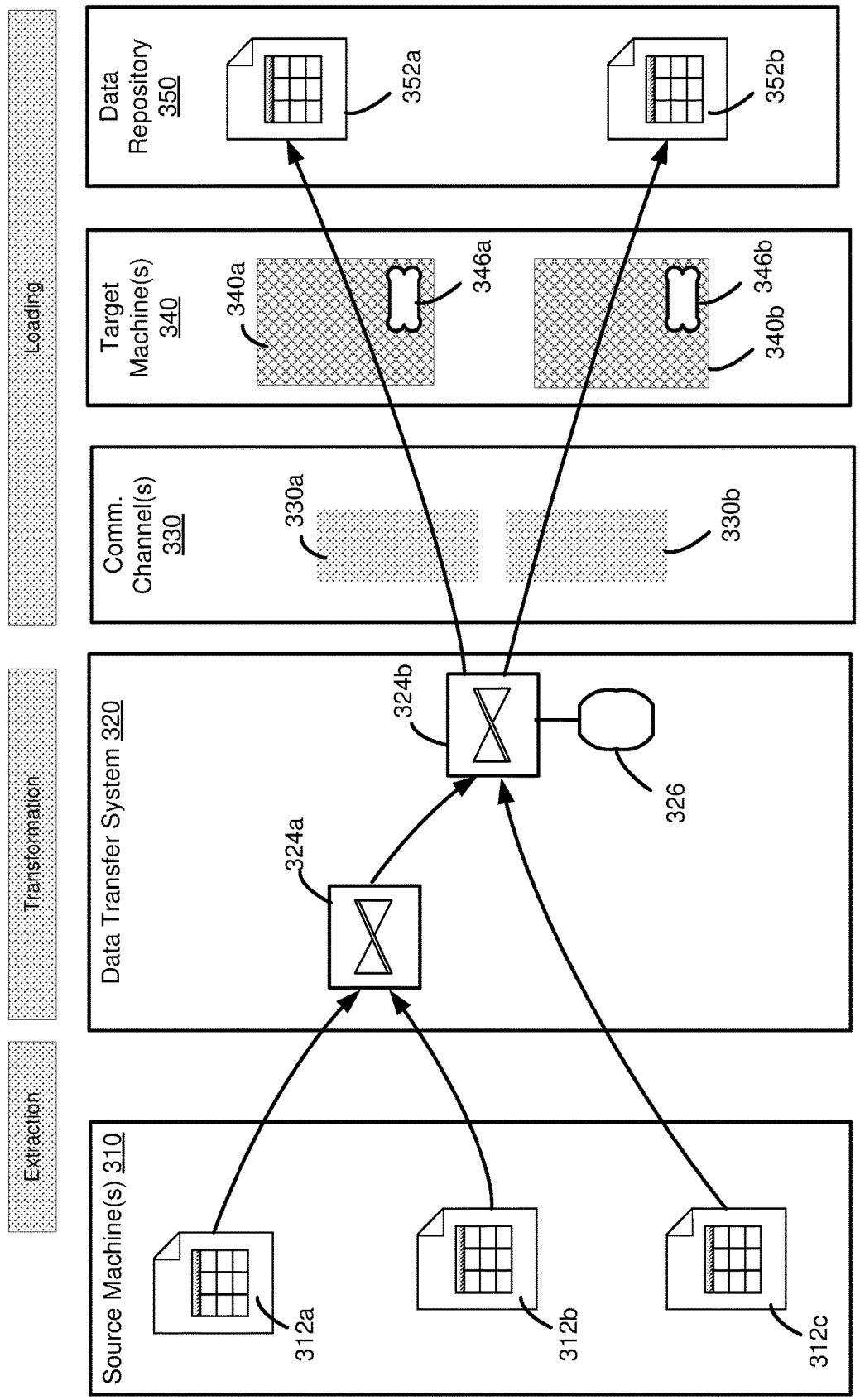
FIG. 3 is a schematic diagram illustrating data flow of an example ETL process.

FIG. 3 shows a schematic diagram illustrating data flow of an example ETL process 300 according to the technologies described herein. The source machines 310, data transfer system 320, communication channels 330, target machines 340, and data repository 350 shown in FIG. 3 correspond to respective system components (e.g., 110, 120, 130, 140, and 150) depicted in FIG. 1. The three phases of the ETL process (extraction, transformation, and loading) are depicted on the top.

In the example ETL process depicted in FIG. 3, original data is extracted from three different data sources 312a, 312b, and 312c. Original data extracted from data sources 312a and 312b are first processed by a first preprocessing stage 324a, whose output is further fed, along with the original data extracted from the data source 312c, to a second preprocessing stage 324b. The preprocessing stages 324a and 324b can be part of the preprocessor 124, and can be configured to implement various transformations of the original data (e.g., data aggregation, data filtering, etc.), as descried above.

The output of the second preprocessing stage 324b can be a plurality of data records for data loading. For example, the generated data records can be sent to two different target machines 340a and 340b via respective communication channels 330a and 330b. If the communication channels 330a and 330b are open and the target applications on the target machines 340a and 340b are also operating normally, then the data records can be received by the target applications and directly stored in corresponding storage locations, such as target databases 352a and 352b.

In case any of the communication channels 330a and 330b is closed or stops working (e.g., network failure or experiencing significant network latency), residual data records for the closed communication channel can be saved in a local buffer 326 (similar to the local buffer 126). Thus, when that communication channel switches open again, the residual data records stored in the local buffer 326 can be sent to the corresponding target machine, thus avoiding the need to recreate those data records through the extraction and transformation phases. Similar operations can be used to handle situations when a target machine is down or offline. For example, when the target machine 340a is down or offline, residual data records for the target machine 340a can be stored in the local buffer 326. When the target machine 340a is back up running or online again, the residual data records stored in the local buffer 326 can then be transmitted to the target machine 340a.

In case any of the target applications running on a target machine becomes non-responsive or stops operating, data records sent to those target machines cannot be directly stored in the data repository. Instead, data records sent to those affected target machines can be stored in target buffers that are local on those target machines. For example, the target machines 340a and 340b can have respective target buffers 346a, 346b (similar to the target buffer 146) configured to store received data records in case the target applications on those target machines stop operating. As described above, when those target applications resumes normal operation, the data records stored in the corresponding target buffers (e.g., 346a, 346b) can be transferred (e.g., by the receiving agent 142) to the corresponding storage locations (e.g., 352a, 352b). Concurrently, newly received data records can be directly stored (e.g., by the target applications) in the corresponding storage locations.

Example 5—Example Use Cases of Improved ETL Process

Figure 4:
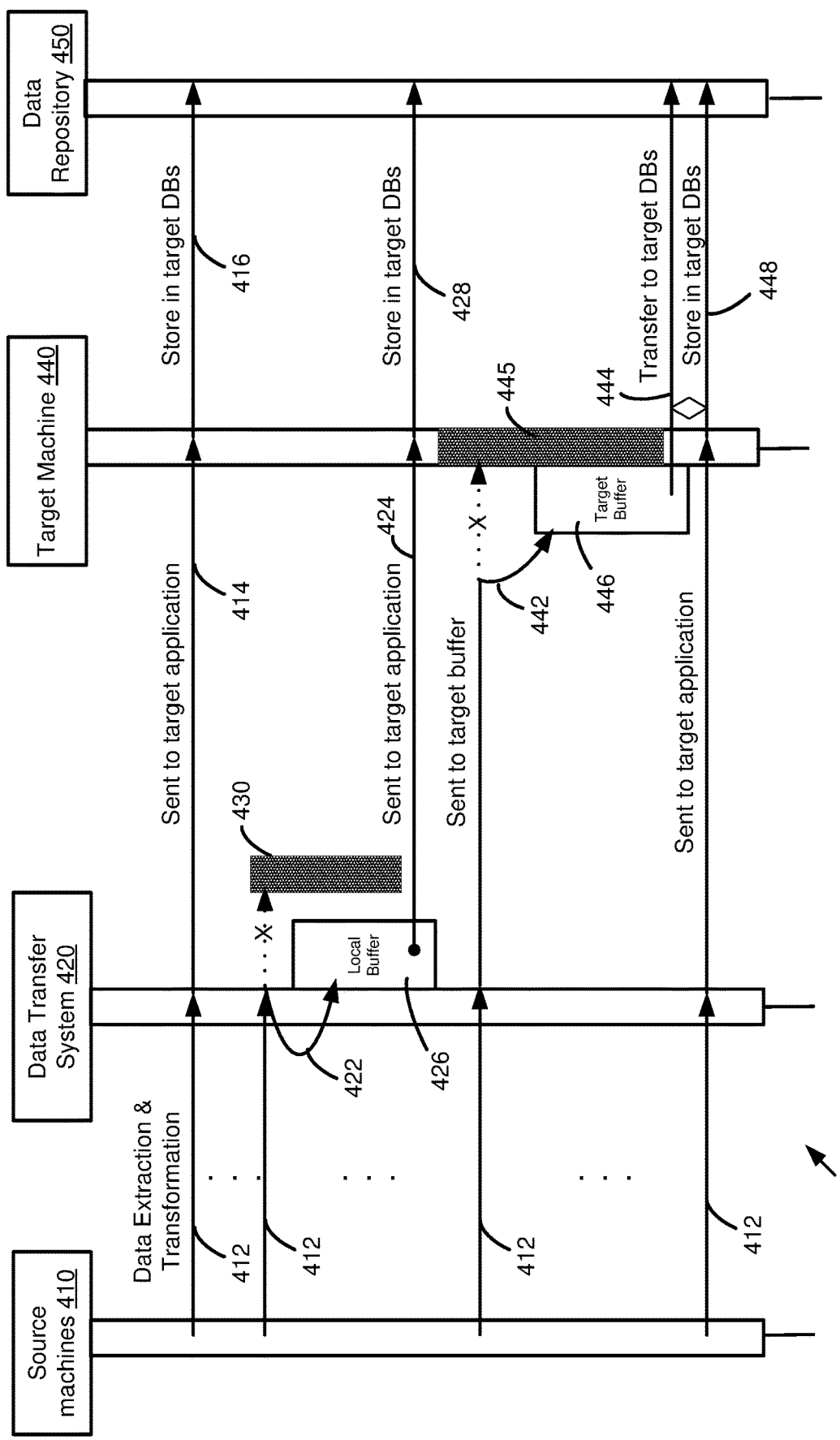
FIG. 4 is a sequence diagram illustrating several use cases of an example ETL process.

FIG. 4 shows a sequence diagram illustrating some use cases of an example ETL process 400 according to the technologies described herein. The source machines 410, data transfer system 420, target machine 440, and data repository 450 shown in FIG. 4 correspond to respective system components (e.g., 110, 120, 140, and 150) shown in FIG. 1. Threads of data transfer between various components are indicated by arrows.

The ETL process 400 starts with data extraction followed by data transformation. For example, original data can be extracted from the source machines 410 and then transformed into a plurality of data records by a preprocessor (e.g., the preprocessor 124) of the data transfer system 420 (thread 412). Data extraction and transformation (thread 412) can run continuously or without interruption until the completion of the ETL process 400.

An ETL agent (e.g., the ETL agent 122) of the data transfer system 420 can determine if an open connection between the ETL agent and a target application (e.g., the target application 144) on the target machine 440 can be established. The connection is open when two conditions are satisfied: (1) the communication channel between the data transfer system 420 and the target machine 440 is open; and (2) the target application is operating. If it is determined that there is an open connection between the ETL agent and the target application, data loading will proceed normally: the data records will be sent from the ETL agent to the target application (thread 414), and then directly stored in one or more target databases of the data repository 450 (thread 416).

If there is no open connection between the ETL agent and the target application, the data loading process will be altered while the data extraction and transformation (thread 412) remain unchanged. Specifically, depending on where the connection is broken, the data records will be buffered either in the data transfer system 420 or the target machine 440, while the ETL agent keeps extracting data from the source machines 410 and transforming the extracted data into new data records.

For example, the ETL agent can continuously and/or periodically monitor the status of the communication channel. If the communication channel between the data transfer system 420 and the target machine 440 is closed (indicated by the block 430), the ETL agent can store any un-transmitted or residual data records (including the continuously generated new data records) for the target machine 440 in a local buffer 426 (similar to the local buffer 126) of the data transfer system 420 (thread 422). After the communication channel switches open, and assume the target application is operating, the ETL agent can send the data records stored in the local buffer 426 to the target application (thread 424), which in turn can store the received data records in the target databases of the data repository 450 (thread 428).

If the communication channel between the data transfer system 420 and the target machine 440 is open, but the target application stops operating (indicated by the block 445), a receiving agent (e.g., the receiving agent 142) of the target machine 440 can redirect the received data records (which can be newly extracted/transformed data records or residual data records sent from the local buffer 426) to a target buffer 446 (similar to the target buffer 146) on the target machine 440 (thread 442).

After the target application resumes operating, the receiving agent of the target machine 440 can transfer the data records stored in the target buffer 446 to the target databases (thread 444). Assume the communication channel between the data transfer system 420 and the target machine 440 remains open, new data records received by the target application (which can be newly extracted/transformed data records or residual data records sent from the local buffer 426) can be directly stored in the target databases (thread 448). As described above, the two threads 444 and 448 can run concurrently or in parallel.

Example 6—Example Advantages

A number of advantages can be achieved via the technologies described herein. As described above, data loading is often the bottleneck of conventional ETL systems. Delayed data loading can occur when the communication networks are disrupted and/or the data loading application on the target machine becomes non-responsive. Existing ETL systems often pause the data loading process and wait until the network disruption is resolved and/or the data loading application is back up running again. The technologies described herein can improve the efficiency of ETL processes by minimizing or reducing the impact of such abnormalities. For example, in case the communication channel and/or the target machine becomes unavailable, residual data records can be temporarily saved in a local buffer. These locally saved data records can be sent to the target machine when the communication channel and/or the target machine recovers, thus avoiding the need to recreate those data records through data extraction and transformation. Furthermore, in case the data loading application on the target machine stopes operating, data records receive by the target machine can be temporarily saved in a target buffer. When the data loading application resumes operating again, the data records saved in the target buffer, along with newly received data records, can be saved in the data repository concurrently. Saving the data records in the target buffer eliminates the needs to retransmit the data records (thus avoiding any network delays of data transmission), while the concurrent data storage protocol can further improve the efficiency of data loading compared to the alternative sequential data storage protocol.

Example 7—Example Computing Systems

Figure 5:
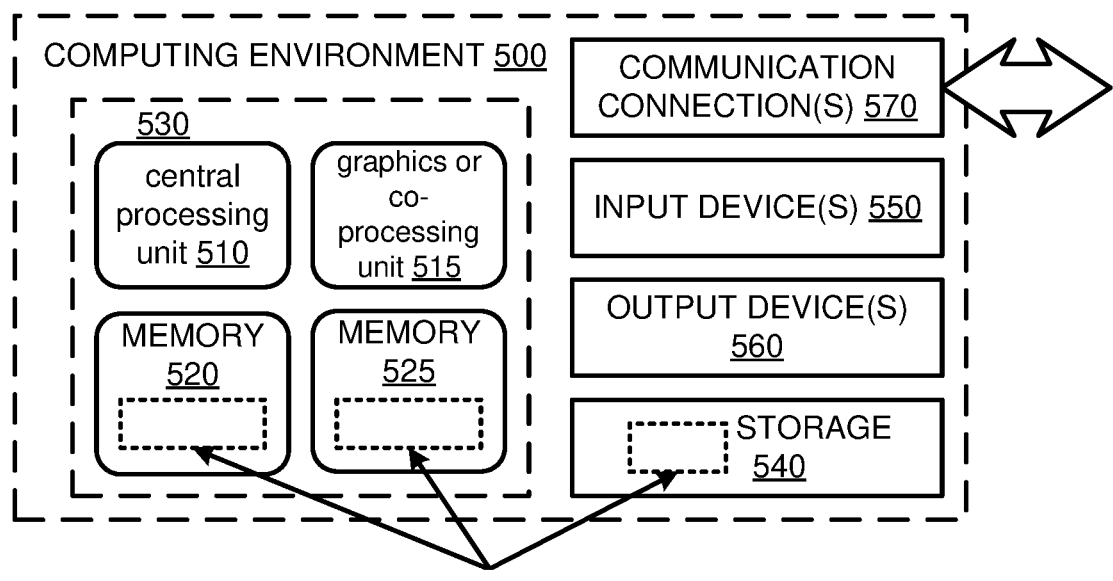
FIG. 5 is a block diagram of an example computing system in which described embodiments can be implemented.

FIG. 5 depicts an example of a suitable computing system 500 in which the described innovations can be implemented. The computing system 500 is not intended to suggest any limitation as to scope of use or functionality of the present disclosure, as the innovations can be implemented in diverse computing systems.

With reference to FIG. 5, the computing system 500 includes one or more processing units 510, 515 and memory 520, 525. In FIG. 5, this basic configuration 530 is included within a dashed line. The processing units 510, 515 can execute computer-executable instructions, such as for implementing the features described in the examples herein (e.g., the method 200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 5 shows a central processing unit 510 as well as a graphics processing unit or co-processing unit 515. The tangible memory 520, 525 can be volatile memory (e.g., registers, cache, RAM), non-volatile memory (e.g., ROM, EEPROM, flash memory, etc.), or some combination of the two, accessible by the processing unit(s) 510, 515. The memory 520, 525 can store software 580 implementing one or more innovations described herein, in the form of computer-executable instructions suitable for execution by the processing unit(s) 510, 515.

A computing system 500 can have additional features. For example, the computing system 500 can include storage 540, one or more input devices 550, one or more output devices 560, and one or more communication connections 570, including input devices, output devices, and communication connections for interacting with a user. An interconnection mechanism (not shown) such as a bus, controller, or network can interconnect the components of the computing system 500. Typically, operating system software (not shown) can provide an operating environment for other software executing in the computing system 500, and coordinate activities of the components of the computing system 500.

The tangible storage 540 can be removable or non-removable, and includes magnetic disks, magnetic tapes or cassettes, CD-ROMs, DVDs, or any other medium which can be used to store information in a non-transitory way and which can be accessed within the computing system 500. The storage 540 can store instructions for the software implementing one or more innovations described herein.

The input device(s) 550 can be an input device such as a keyboard, mouse, pen, or trackball, a voice input device, a scanning device, touch device (e.g., touchpad, display, or the like) or another device that provides input to the computing system 500. The output device(s) 560 can be a display, printer, speaker, CD-writer, or another device that provides output from the computing system 500.

The communication connection(s) 570 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 8—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 9—Example Cloud Computing Environment

Figure 6:
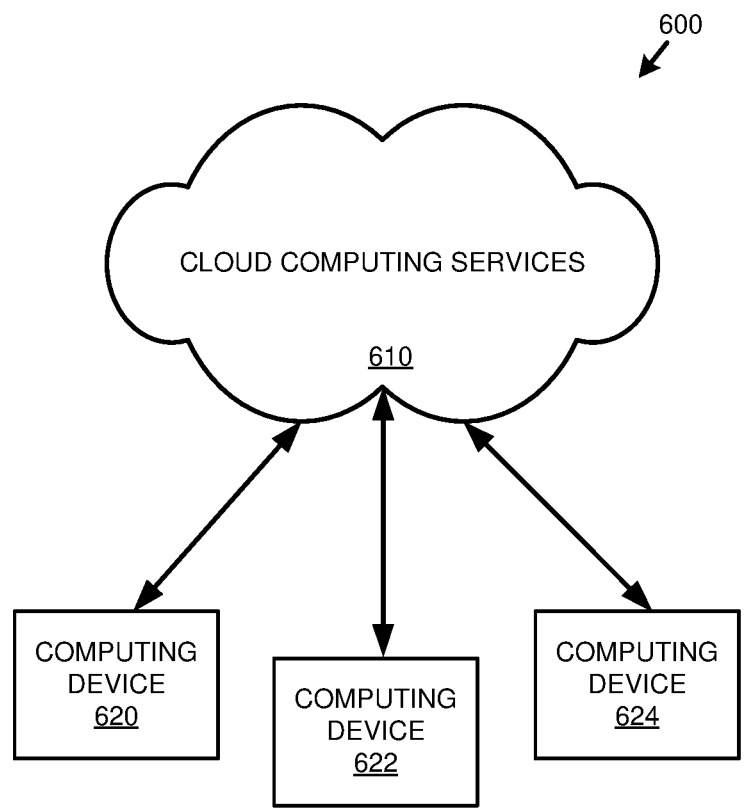
FIG. 6 is a block diagram of an example cloud computing environment that can be used in conjunction with the technologies described herein.

FIG. 6 depicts an example cloud computing environment 600 in which the described technologies can be implemented, including, e.g., the system 100 and other systems herein. The cloud computing environment 600 can include cloud computing services 610. The cloud computing services 610 can comprise various types of cloud computing resources, such as computer servers, data storage repositories, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 can be utilized by various types of computing devices (e.g., client computing devices), such as computing devices 620, 622, and 623. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operations (e.g., data processing, data storage, and the like).

In practice, cloud-based, on-premises-based, or hybrid scenarios can be supported.

Example 10—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 11—Example Embodiments

Any of the following example embodiments can be implemented.

Example 1. A computer-implemented method comprising: obtaining, in a data transfer system, a plurality of data records from one or more data sources; monitoring operating status of a target application running on a target machine, wherein the target application is configured to manage data storage in a data repository that is local to the target application; responsive to finding that the target application stops operating, sending one or more first data records from the data transfer system to the target machine and storing the one or more first data records in a target buffer on the target machine; responsive to finding that the target application resumes operating, sending one or more second data records from the data transfer system to the target machine and directly storing the one or more second data records in the data repository, wherein the one or more second data records are distinct from the one or more first data records; and while sending the one or more second data records, transferring the one or more first data records from the target buffer to the data repository.

Example 2. The method of example 1, wherein obtaining the plurality of data records comprises extracting original data from the one or more data sources and transforming the extracted original data into the plurality of data records.

Example 3. The method of any one of examples 1-2, wherein monitoring operating status of the target application comprises checking one or more parameter values of the target application through an application programming interface of the target application.

Example 4. The method of any one of examples 1-3, further comprising synchronizing storage of the one or more first data records and the one or more second data records on the data repository.

Example 5. The method of any one of examples 1-4, further comprising monitoring a communication channel between the data transfer system and the target machine, wherein sending the first or second data records from the data transfer system to the target machine is conditioned upon the communication channel being open.

Example 6. The method of example 5, wherein the data transfer system and the target machine are connected via one or more networks, wherein monitoring the communication channel comprises diagnosing connection status of the one or more networks based on a network protocol.

Example 7. The method of any one of examples 5-6, further comprising: responsive to detecting that the communication channel is closed, storing residual data records in a local buffer on the data transfer system, wherein the residual data records comprise data records that have not been sent from the data transfer system to the target machine.

Example 8. The method of example 7, further comprising: responsive to detecting that the communication channel switches open, sending the residual data records from the local buffer to the target machine.

Example 9. The method of any one of examples 7-8, wherein the target machine is a first target machine, the communication channel is a first communication channel, and the residual data records are first residual data records, the method further comprising: monitoring a second communication channel between the data transfer system and a second target machine; responsive to detecting that the second communication channel is closed, storing second residual data records in the local buffer, wherein the second residual data records comprise data records that have not been sent from the data transfer system to the second target machine; and responsive to detecting that the second communication channel switches open, sending the second residual data records from the local buffer to the second target machine.

Example 10. The method of example 9, further comprising tracking last data records that have been sent from the data transfer system to the first and second target machines, respectively, and wherein data records stored in the local buffer represent a union of the first residual data records and the second residual data records.

Example 11. A computing system, comprising: memory; one or more hardware processors coupled to the memory; and one or more computer readable storage media storing instructions that, when loaded into the memory, cause the one or more hardware processors to perform operations comprising: obtaining, in a data transfer system, a plurality of data records from one or more data sources; monitoring operating status of a target application running on a target machine, wherein the target application is configured to manage data storage in a data repository that is local to the target application; responsive to finding that the target application stops operating, sending one or more first data records from the data transfer system to the target machine and storing the one or more first data records in a target buffer on the target machine; responsive to finding that the target application resumes operating, sending one or more second data records from the data transfer system to the target machine and directly storing the one or more second data records in the data repository, wherein the one or more second data records are distinct from the one or more first data records; and while sending the one or more second data records, transferring the one or more first data records from the target buffer to the data repository.

Example 12. The system of example 11, wherein obtaining the plurality of data records comprises extracting original data from the one or more data sources and transforming the extracted original data into the plurality of data records.

Example 13. The system of any one of examples 11-12, wherein monitoring operating status of the target application comprises checking one or more parameter values of the target application through an application programming interface of the target application.

Example 14. The system of any one of examples 11-13, wherein the operations further comprise synchronizing storage of the one or more first data records and the one or more second data records on the data repository.

Example 15. The system of any one of examples 11-14, wherein the operations further comprise monitoring a communication channel between the data transfer system and the target machine, wherein sending the first or second data records from the data transfer system to the target machine is conditioned upon the communication channel being open.

Example 16. The system of example 15, wherein the operations further comprise: responsive to detecting that the communication channel is closed, storing residual data records in a local buffer on the data transfer system, wherein the residual data records comprise data records that have not been sent from the data transfer system to the target machine.

Example 17. The system of example 16, wherein the operations further comprise: responsive to detecting that the communication channel switches open, sending the residual data records from the local buffer to the target machine.

Example 18. The system of any one of examples 16-17, wherein the target machine is a first target machine, the communication channel is a first communication channel, and the residual data records are first residual data records, wherein the operations further comprise: monitoring a second communication channel between the data transfer system and a second target machine; responsive to detecting that the second communication channel is closed, storing second residual data records in the local buffer, wherein the second residual data records comprise data records that have not been sent from the data transfer system to the second target machine; and responsive to detecting that the second communication channel switches open, sending the second residual data records from the local buffer to the second target machine.

Example 19. The system of example 18, wherein the operations further comprise tracking last data records that have been sent from the data transfer system to the first and second target machines, respectively, and wherein data records stored in the local buffer represent a union of the first residual data records and the second residual data records.

Example 20. One or more non-transitory computer-readable media having encoded thereon computer-executable instructions causing one or more processors to perform a method comprising: in a data transfer system, extracting original data from one or more data sources and transforming the extracted original data into a plurality of data records; monitoring operating status of a target application running on a target machine, wherein the target application is configured to manage data storage in a data repository that is local to the target application; responsive to finding that the target application stops operating, sending one or more first data records from the data transfer system to the target machine and storing the one or more first data records in a target buffer on the target machine; responsive to finding that the target application resumes operating, sending one or more second data records from the data transfer system to the target machine and directly storing the one or more second data records in the data repository, wherein the one or more second data records are distinct from the one or more first data records; and while sending the one or more second data records, transferring the one or more first data records from the target buffer to the data repository.

Example 12—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
   obtaining, in a data transfer system, a plurality of data records from one or more data sources;
   monitoring operating status of a target application running on a target machine, wherein the target application is configured to manage data storage in a data repository that is local to the target application;
   responsive to finding that the target application stops operating, sending one or more first data records from the data transfer system to the target machine and storing the one or more first data records in a target buffer on the target machine;
   responsive to finding that the target application resumes operating, sending one or more second data records from the data transfer system to the target machine, wherein the target application stores the one or more second data records in the data repository via a first thread of data transfer without first storing the one or more second data records in the target buffer, wherein the one or more second data records are distinct from the one or more first data records; and
   while sending the one or more second data records, concurrently transferring the one or more first data records from the target buffer to the data repository in a second thread of data transfer that is separate from the first thread of data transfer.

2. The method of claim 1, wherein obtaining the plurality of data records comprises extracting original data from the one or more data sources and transforming the extracted original data into the plurality of data records.

3. The method of claim 1, wherein monitoring operating status of the target application comprises checking one or more parameter values of the target application through an application programming interface of the target application.

4. The method of claim 1, further comprising synchronizing storage of the one or more first data records and the one or more second data records on the data repository.

5. The method of claim 1, further comprising monitoring a communication channel between the data transfer system and the target machine, wherein sending the first or second data records from the data transfer system to the target machine is conditioned upon the communication channel being open.

6. The method of claim 5, wherein the data transfer system and the target machine are connected via one or more networks, wherein monitoring the communication channel comprises diagnosing connection status of the one or more networks based on a network protocol.

7. The method of claim 5, further comprising: responsive to detecting that the communication channel is closed, storing residual data records in a local buffer on the data transfer system, wherein the residual data records comprise data records that have not been sent from the data transfer system to the target machine.

8. The method of claim 7, further comprising: responsive to detecting that the communication channel switches open, sending the residual data records from the local buffer to the target machine.

9. The method of claim 7, wherein the target machine is a first target machine, the communication channel is a first communication channel, and the residual data records are first residual data records, the method further comprising:
   monitoring a second communication channel between the data transfer system and a second target machine;
   responsive to detecting that the second communication channel is closed, storing second residual data records in the local buffer, wherein the second residual data records comprise data records that have not been sent from the data transfer system to the second target machine; and
   responsive to detecting that the second communication channel switches open, sending the second residual data records from the local buffer to the second target machine.

10. The method of claim 9, further comprising tracking last data records that have been sent from the data transfer system to the first and second target machines, respectively, and wherein data records stored in the local buffer represent a union of the first residual data records and the second residual data records.

11. A computing system, comprising:
    memory;
    one or more hardware processors coupled to the memory; and
    one or more computer readable storage media storing instructions that, when loaded into the memory, cause the one or more hardware processors to perform operations comprising:
    obtaining, in a data transfer system, a plurality of data records from one or more data sources;
    monitoring operating status of a target application running on a target machine, wherein the target application is configured to manage data storage in a data repository that is local to the target application;
    responsive to finding that the target application stops operating, sending one or more first data records from the data transfer system to the target machine and storing the one or more first data records in a target buffer on the target machine;
    responsive to finding that the target application resumes operating, sending one or more second data records from the data transfer system to the target machine, wherein the target application stores the one or more second data records in the data repository via a first thread of data transfer without first storing the one or more second data records in the target buffer, wherein the one or more second data records are distinct from the one or more first data records; and
    while sending the one or more second data records, concurrently transferring the one or more first data records from the target buffer to the data repository in a second thread of data transfer that is separate from the first thread of data transfer.

12. The system of claim 11, wherein obtaining the plurality of data records comprises extracting original data from the one or more data sources and transforming the extracted original data into the plurality of data records.

13. The system of claim 11, wherein monitoring operating status of the target application comprises checking one or more parameter values of the target application through an application programming interface of the target application.

14. The system of claim 11, wherein the operations further comprise synchronizing storage of the one or more first data records and the one or more second data records on the data repository.

15. The system of claim 11, wherein the operations further comprise monitoring a communication channel between the data transfer system and the target machine, wherein sending the first or second data records from the data transfer system to the target machine is conditioned upon the communication channel being open.

16. The system of claim 15, wherein the operations further comprise: responsive to detecting that the communication channel is closed, storing residual data records in a local buffer on the data transfer system, wherein the residual data records comprise data records that have not been sent from the data transfer system to the target machine.

17. The system of claim 16, wherein the operations further comprise: responsive to detecting that the communication channel switches open, sending the residual data records from the local buffer to the target machine.

18. The system of claim 16, wherein the target machine is a first target machine, the communication channel is a first communication channel, and the residual data records are first residual data records, wherein the operations further comprise:
- monitoring a second communication channel between the data transfer system and a second target machine;
- responsive to detecting that the second communication channel is closed, storing second residual data records in the local buffer, wherein the second residual data records comprise data records that have not been sent from the data transfer system to the second target machine; and
- responsive to detecting that the second communication channel switches open, sending the second residual data records from the local buffer to the second target machine.

19. The system of claim 18, wherein the operations further comprise tracking last data records that have been sent from the data transfer system to the first and second target machines, respectively, and wherein data records stored in the local buffer represent a union of the first residual data records and the second residual data records.

20. One or more non-transitory computer-readable media having encoded thereon computer-executable instructions causing one or more processors to perform a method comprising:
- in a data transfer system, extracting original data from one or more data sources and transforming the extracted original data into a plurality of data records;
- monitoring operating status of a target application running on a target machine, wherein the target application is configured to manage data storage in a data repository that is local to the target application;
- responsive to finding that the target application stops operating, sending one or more first data records from the data transfer system to the target machine and storing the one or more first data records in a target buffer on the target machine;
- responsive to finding that the target application resumes operating, sending one or more second data records from the data transfer system to the target machine, wherein the target application stores the one or more second data records in the data repository via a first thread of data transfer without first storing the one or more second data records in the target buffer, wherein the one or more second data records are distinct from the one or more first data records; and
- while sending the one or more second data records, concurrently transferring the one or more first data records from the target buffer to the data repository in a second thread of data transfer that is separate from the first thread of data transfer.

* * * * *